(12) United States Patent
Gasca et al.

(10) Patent No.: US 7,031,590 B2
(45) Date of Patent: Apr. 18, 2006

(54) OPTICAL GUIDE COMPRISING AN AMPLIFIER MEDIUM AND A METHOD FOR PRODUCING SAID GUIDE

(75) Inventors: Laurent Gasca, Villebon sur Yvette (FR); Alain Pastouret, Les Ulis (FR); Christine Moreau, Palaiseau (FR); Pascal Baniel, Draveil (FR); Christian Belouet, Sceaux (FR)

(73) Assignee: Alcatel, Paris (FR)

( * ) Notice: Subject to any disclaimer, the term of this patent is extended or adjusted under 35 U.S.C. 154(b) by 263 days.

(21) Appl. No.: 10/387,565

(22) Filed: Mar. 14, 2003

(65) Prior Publication Data

US 2003/0175003 A1 Sep. 18, 2003

(30) Foreign Application Priority Data

Mar. 18, 2002 (FR) .................................. 02 03311

(51) Int. Cl.
*G02B 6/16* (2006.01)
(52) U.S. Cl. ................... 385/142; 385/122; 385/123; 385/129; 385/143; 385/144; 385/145
(58) Field of Classification Search ........ 385/141–142, 385/123, 129, 132; 501/5
See application file for complete search history.

(56) References Cited

U.S. PATENT DOCUMENTS 5,717,517 A 2/1998 Alfano et al.
6,297,179 B1 * 10/2001 Beall et al. .................... 501/5

FOREIGN PATENT DOCUMENTS

WO WO 01/28946 A1 4/2001

* cited by examiner

*Primary Examiner*—Frank G. Font
*Assistant Examiner*—Michael P. Mooney
(74) *Attorney, Agent, or Firm*—Sughrue Mion, PLLC

(57) ABSTRACT

The present invention concerns an optical guide (100) comprising an amplifier medium including:
  a core (10) in a main matrix of a transparent material, the main matrix containing particles (1, 2), each particle being formed of a submicronic matrix distinct from the main matrix and doped by an active metal element,
  an external guiding cladding (11) in contact with the core (10).

The size of the particles (1, 2) is smaller than 20 nm.

The present invention also concerns a method for producing this guide.

22 Claims, 4 Drawing Sheets

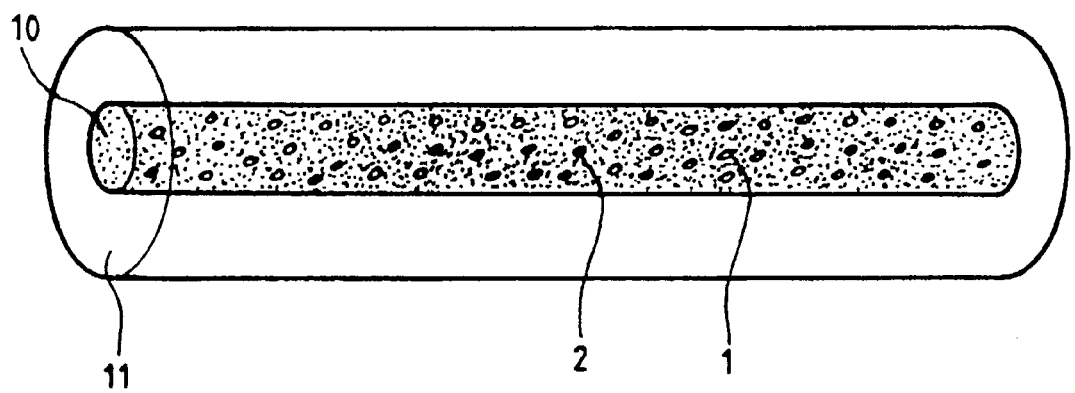
FIG_1
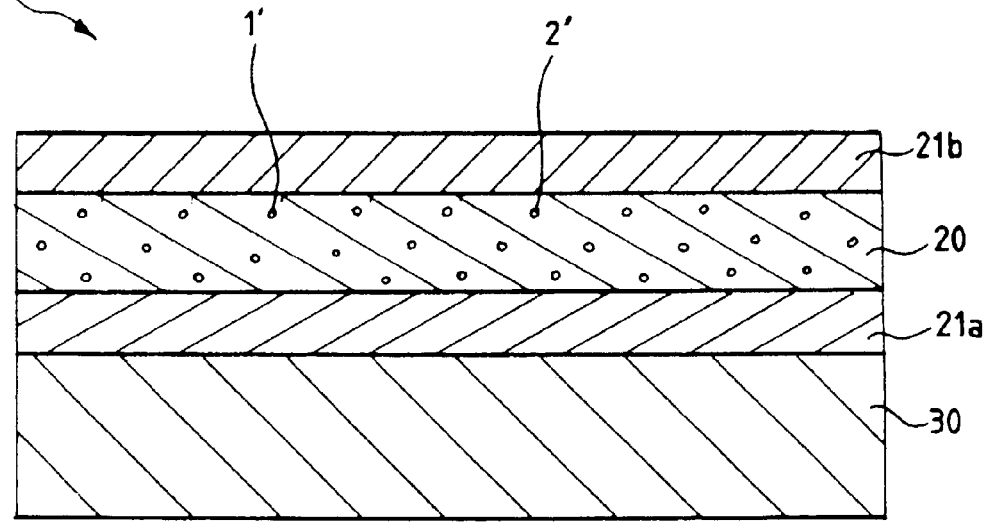
FIG_2

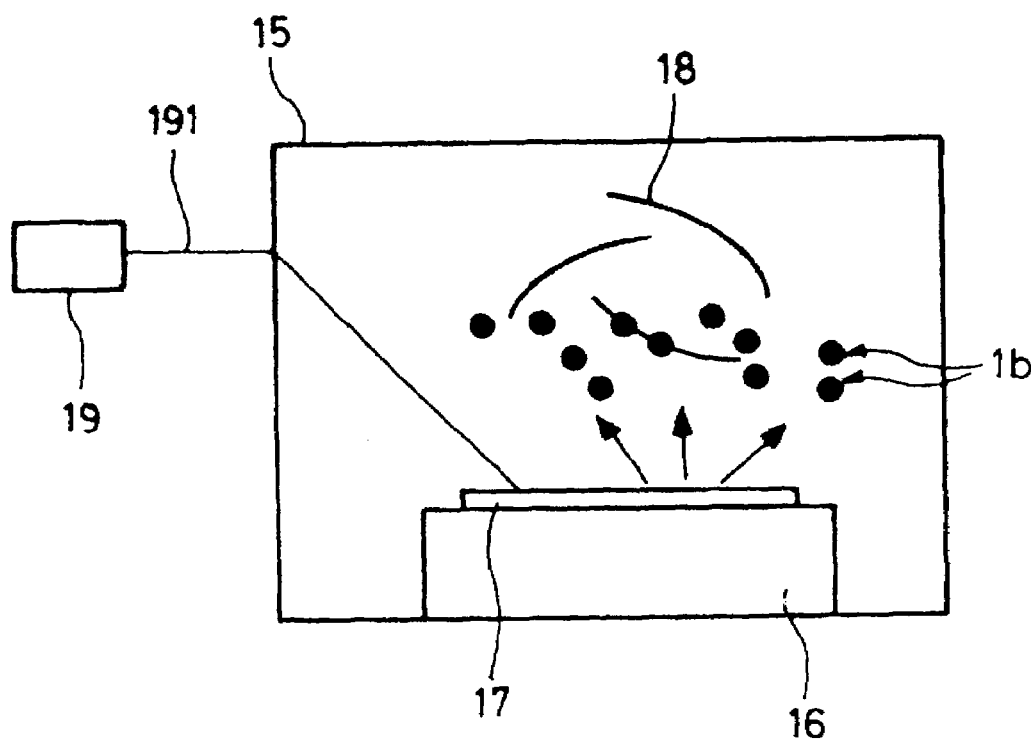
FIG_4

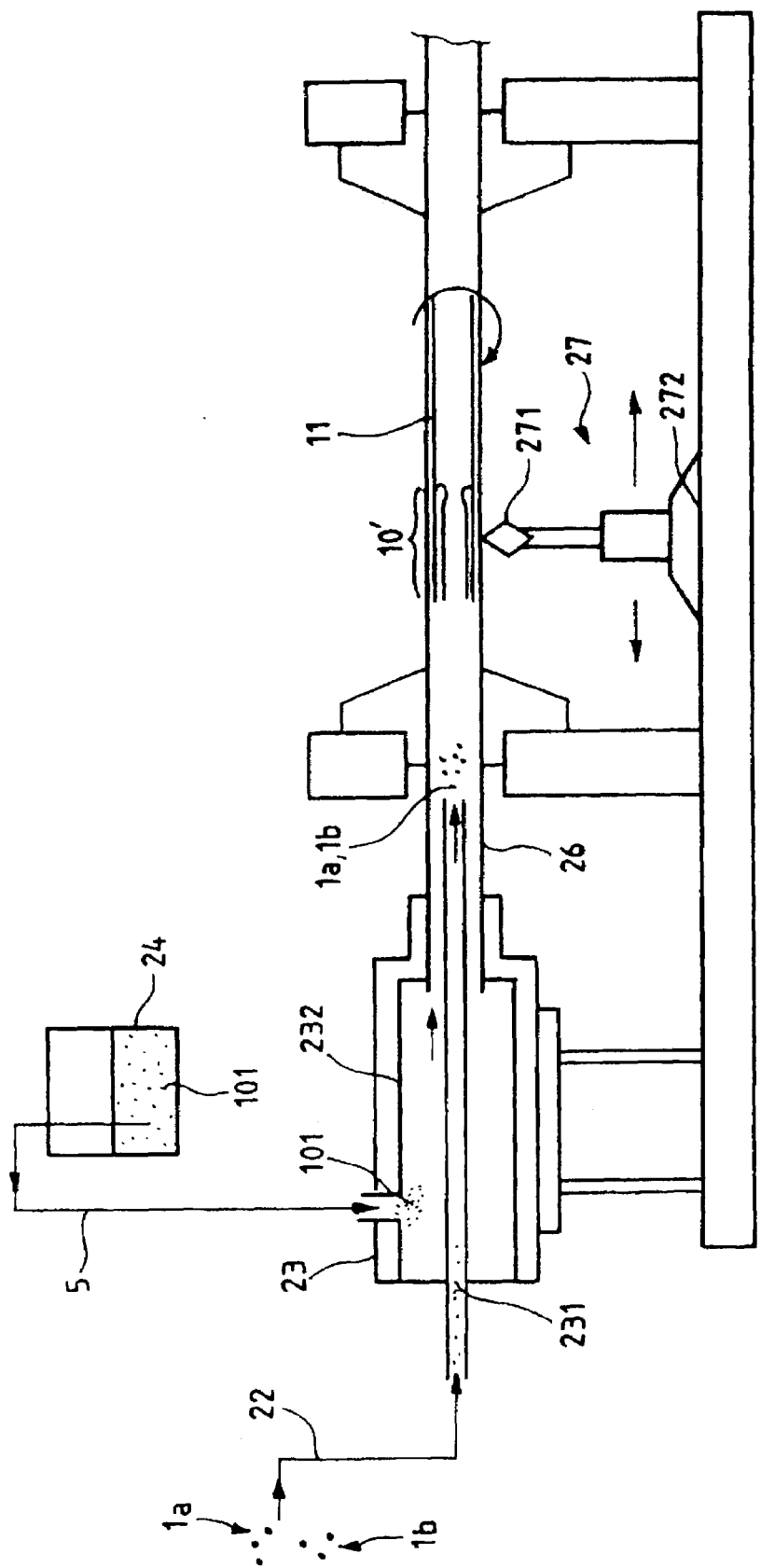
FIG_5

OPTICAL GUIDE COMPRISING AN AMPLIFIER MEDIUM AND A METHOD FOR PRODUCING SAID GUIDE

FIELD OF THE INVENTION

The present invention concerns the field of optical telecommunications and more specifically an optical guide comprising an amplifier medium and a method for producing said guide.

BACKGROUND OF THE INVENTION

A guide used to constitute an amplifier or a laser, for example an optical fiber or a planar guide, traditionally comprises an amplifier medium including:
- a core in a matrix of a transparent material incorporating active doping elements which are the source of the amplification phenomenon, such as metallic ions of rare earths such as erbium,
- a cladding for guiding the luminous power which for the most part is transmitted by the core.

Thus, the U.S. Pat. No. 5,717,517 provides information of an amplifying optical fiber comprising an amplifier medium including:
- a core in a main matrix of a transparent material (glass or polymer) containing crystalline particles, each particle being formed of a submicronic matrix (forsterite, YAG, $Ca_2SiO_4$, or even $LiGaO_2$, $LiAlO_2$) distinct from the main matrix and doped by an active metallic ion ($V^{3+}$ or $Cr^{4+}$),
- a guiding cladding surrounding the core.

However, this fiber exhibits significant losses via diffusion of the light, thus limiting its optical performances.

SUMMARY OF THE INVENTION

An aspect of the present invention is to install an optical guide having optimized optical performances (reduction of optical losses, increase of gain).

To this effect, the invention provides an optical guide comprising an amplifier medium including:
- a core in a main matrix of a transparent material, the main matrix containing particles, each formed of a submicronic matrix distinct from the main matrix and doped by an active metallic element,
- an external guiding cladding in contact with the core, wherein the size of the particles is smaller than 20 nm and wherein said active element is absent from the main matrix.

The size of the particles of the invention, reduced with respect to that of particles of the prior art, makes it possible to, not only reduce losses via diffusion, but also increase the possible concentration of particles dispersed in the matrix so as in particular to increase the gain of an amplifier, whilst avoiding the 'quenching' phenomenon. This phenomenon occurs when two active doping elements, extremely close to one another and indeed forming aggregates, interact with one another until the amplifier effect is annulled.

Moreover, depending on the selected production method, the particles of the invention are crystalline or amorphous, their structures needing to be adequate with the sought-after performances.

Advantageously, the main matrix can contain several types of particles, the particles of various types being distinct from one another by virtue of their distinct submicronic matrix and/or by their distinct active element.

The main matrix of the invention thus contains a variety of particles contrary to the case with the prior art. By selecting various submicronic matrices for a given active element, the invention is able to diversify its local chemical environment and preferably allows diversification of its nearby environments. From this point on, the spectral photoluminescence response of an active element shall depend on the choice of its chemical environment and, for example, be offset. In this way, by virtue of the total response resulting from the sum of these distinct individual responses, it is possible to create new spectral bands by means of the invention.

Furthermore, the use of particles comprising distinct active elements make it possible to cover more spectral bands.

To sum up, the nature of the particles (choice coupled with the element or active elements and the submicronic matrix), their sizes (within a limit of 20 nm), and their relative concentrations in the main matrix are adjusted so as to provide the total response profile.

Moreover, the submicronic matrix of the invention can be selected from metallic oxide-based matrices and fluoride-based matrices, metallic oxyfluoride-based matrices, sulfur-based matrices and preferably from the group of silica-based matrices and matrices containing the ions $La^{3+}$ and/or $Al^{3+}$, said ions to be advantageously placed in the atomic environment close to the active metallic element.

Preferably, the metallic active element can be selected from the ions of rare earths and the ions of transition metals and preferably from erbium, ytterbium, thulium ions and the ions $Cr^{4+}$ and $Mn^{3+}$.

In addition, the transparent material can be selected from vitreous materials and polymers and preferably from silica glass, polycarbonates, methyl polymethacrylates and polymers containing fluorine. Advantageously, the optical guide of the invention can be selected from an optical fiber and a planar guide.

Another aspect of the present invention is to establish a reliable method for producing an optical guide as described previously.

Thus, the invention concerns a method for producing an optical guide comprising an amplifier medium including:
- a core in a main matrix of a transparent material, the main matrix containing particles, each formed of a submicronic matrix distinct from the main matrix and doped by an active metallic element,
- an external guiding cladding in contact with the core, wherein it includes the following stages:
- a stage for preparing said particles selected from chemical synthesis and laser ablation,
- a stage for incorporating said particles in a precursor of the main matrix.

The stage for preparing the particles of the invention is separated from the stage for preparing the precursor of the main matrix. This makes it easier to control the production of these particles and in particular their local chemical environment by selecting a suitable submicronic matrix distinct from the main matrix. Thus, the active metallic element is absent from the main matrix.

Chemical synthesis and laser ablation makes it possible to choose and control the size and nature of the particles produced.

When several types of particles are produced during the preparation stage, the incorporation of various types in the precursor can be carried out simultaneously or sequentially.

The chemical synthesis of the invention may include a stage for the standard "sol-gel" of the organometallic precursors of said particles including the active element followed by a stage for forming the organometallic droplets by the vaporization of the organometallic precursors, and a stage for transforming the droplets into particles by eliminating the organic elements.

The standard "sol-gel" production stage may include:
mixing in an alcohol solution a compound containing the metal of the active element with sol-gel monomers each comprising a complexing organic compound linked to a first metal alkoxide,
the formation of organometallic cores by complexing the metal of the active element,
the growth of said organometallic cores in the organometallic compounds by adding second metal alkoxides reacting with the first alkoxides,
the cross-linking of the structure of said compounds via the standard intramolecular sol-gel reaction so as to form said organometallic precursors.

The local chemical environment shall mainly depend on the choice of the metals of the first and second metal alkoxides.

The first and second metal alkoxides of the invention can be preferably selected from silicon and aluminum alkoxides and the organic complexing compound can be selected from atoms or groups of donor atoms and preferabvly amines, acetates, beta-dietonates, thiols and ethers.

Moreover, the laser ablation of the invention may include a stage for ejecting atoms via the irradiation of a target doped by said active elements, said target being selected from the composition targets approximately identical to said particles, followed by a stage for forming said particles via condensation under gas pressure of the ejected atoms.

Advantageously, the targets of the invention can be selected from doped metallic oxides and doped metallic fluorides and preferably $Al_2O_3$ doped by erbium ions, $Sb_2O_3$ doped by thulium ions, $LaF_3$ doped by erbium ions, $Y_2O_3$ doped by erbium ions and doped ZnO.

The stage for incorporating particles can be selected from a stage for impregnating said precursor of the main matrix, a stage for placing a chemical vapour phase deposit on said precursor and a stage for forming a mixture in the precursor.

The method of the invention may further include a stage for forming said precursor of the main matrix by a depositing on at least one portion of the cladding, preferably selected from chemical vapor phase deposits and hydroextraction deposits.

The chemical vapor phase deposition, and more specifically modified vapor phase deposition, are used for example for producing optical fibers.

Deposition by hydro-extraction are used in particular to embody the polymer layers of a planar guide.

BRIEF DESCRIPTION OF THE DRAWINGS

The characteristics and aspects of the present invention are shown in the following detailed description with reference to the accompanying figures given by way of non-restrictive illustration. In these figures:

FIG. 1 represents a diagrammatic side view of an optical amplifying fiber according to the invention, FIG. 2 represents a diagramatic cutaway view of a planar guide according to the invention and used as an amplifier, FIG. 3 diagrammatically shows a stage for preparing a particle according to the invention by means of chemical synthesis, FIG. 4 diagrammatically shows a stage for preparing particles according to the invention by means of laser ablation, FIG. 5 diagramatically shows a stage for incorporating said particles of the invention in a precursor of the main matrix of an optical amplifying fiber according to the invention.

DETAILED DESCRIPTION OF THE PREFERRED EMBODIMENTS

Figure 3:
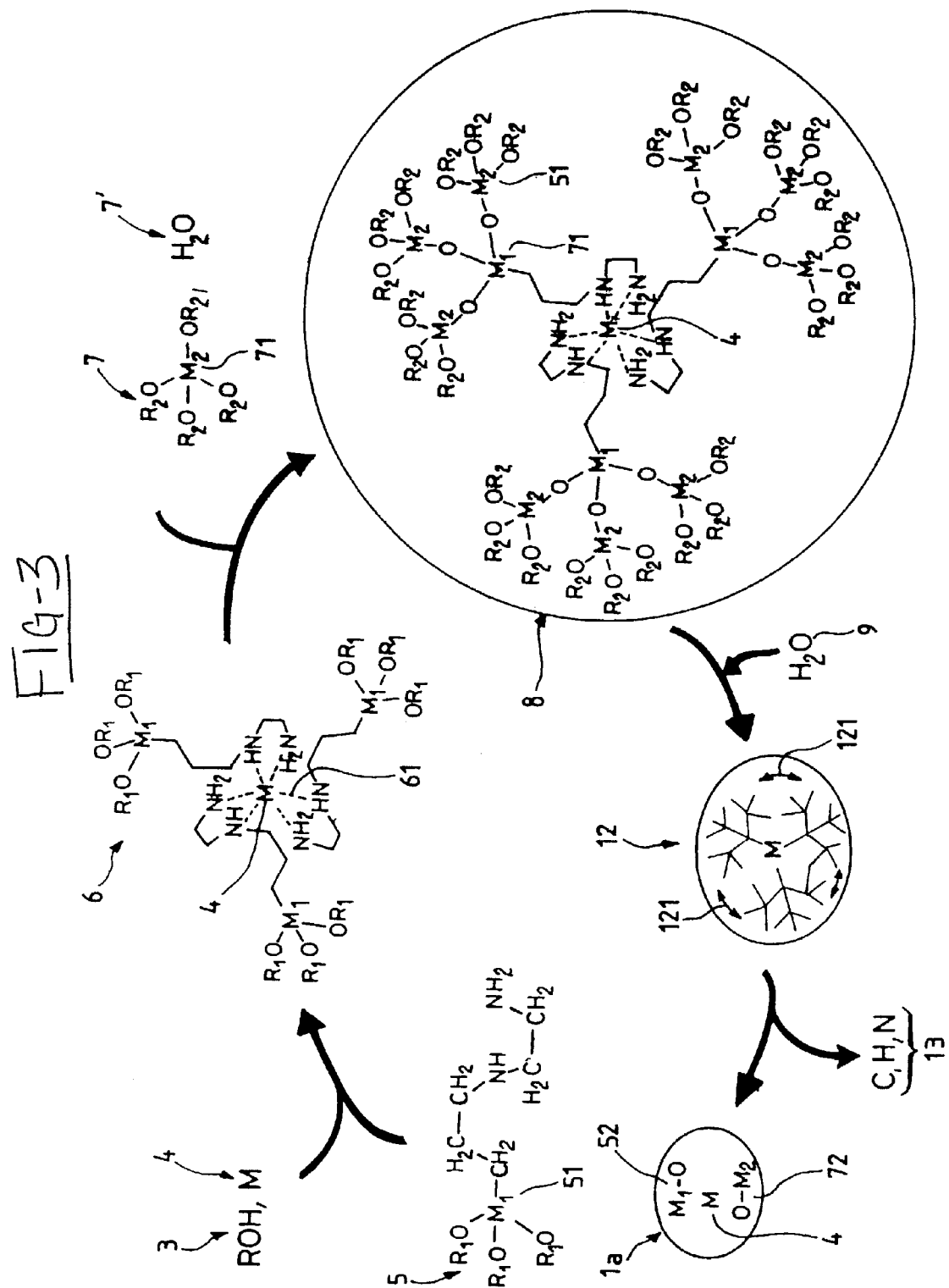

FIG. 1 shows a side view of an optical amplifying fiber 100 according to the invention and used as an amplifier or laser.

The optical fiber 100 comprises an amplifier medium including:
a core 10 in a main matrix of a transparent vitreous material, such as a silicate, the main matrix containing two types of particles 1, 2, said particles being formed by a submicronic matrix having a base made of $Al_2O_3$ and $Sb_2O_3$ doped by erbium ions, and a submicronic matrix with a base of $Y_2O_3$ doped by thulium ions respectively,
an external guiding cladding 11 in contact with the core 10, for example made of a germano type material or phosphosilicate containing fluorine or boron as an element able to lower its refraction index.

According to the invention, the size of the particles 1, 2 is less than 20 nm. In addition, the index difference between the particles and the main matrix is preferably smaller than 0.6.

FIG. 2 shows a diagrammatic cutaway view of a planar guide 200 according to the invention and used as an amplifier.

The planar guide 200 comprises an amplifier medium including three layers 21a, 20, 21b successively deposited on a silicon substrate 30. The layer 20 corresponding to the core is situated between the two epoxy or acrylic polymer layers 21a, 21b corresponding to the guiding cladding.

The core is in a main matrix of a transparent polymer, for example at 1,55 µm such as amorphous (APC) Poly[Bisphenol A carbonate-co-4,4'-(3,3,5 trimethylcyclohexylidene) diphenol carbonate] from the Aldrich company, polymethylmethacrylate (PMMA), a polyimide polymer containing fluorine.

The main matrix contains two types of particles 1', 2'. The particles 1', 2' are respectively formed of a submicronic matrix with an $Al_2O_3$ base doped by erbium ions and a submicronic matrix with a $Y_2O_3$ base doped by thulium ions.

According to the invention, the size of the particles 1', 2' is less than 20 nm. In addition, the index difference between the particles and the main matrix is preferably less than 0.6.

By way of example, if it is desired to have optical losses of less than 1 db in a core measuring 5 µm and refraction index of about 1.5, the losses by Rayleigh scattering need to be limited to 0.01 dB/m for a long fiber (about one hundred meters), 0.1 dBm for a short fiber (about ten meters) or even 10 dB/m for a planar guide (about 0.1 meters).

Losses smaller than 0.01 dB/m are obtained by using the particles of the invention measuring 5 nm at an atomic weight concentration of 1% with a refraction index difference between 0.1 and 0.2 or at an atomic weight concentration of 0.1% for a refraction index difference between 0.1 and 0.5.

Losses smaller than 0.1 dB/m are obtained by using particles of the invention measuring 10 nm at an atomic weight concentration of 1% with a refraction index difference between 0.1 and 0.2 or at an atomic weight concentration of 0.1% for a refraction index difference between 0.1 and 0.5.

The limit of 10 dB/m is not reached by using the 10 nm particles of the invention at an atomic weight concentration of 1% with a refraction index difference between 0.1 and 0.5.

For the long fibers, a low doping shall preferably be selected, for example about 0.1% in weight and a higher doping for the short fibers or planar guides, such as more than 1% in weight.

The particles of the invention can be prepared by chemical synthesis. Chemical synthesis firstly includes a standard sol-gel production of the organometallic precursors of the particles, including the active element, obtained in the form of a solution or stable suspension in an alcohol solvent. Next, a stage is carried out for forming organometallic droplets by vaporizing the organometallic precursors obtained by the nebulization of the solution or suspension containing the precursors. This stage is followed by a droplet transport stage by means of an inert vector gas followed by a stage for transforming the droplets into the particles of the invention by eliminating the organic elements.

FIG. 3 diagrammatially shows a stage for preparing a particle $1a$ of the invention by this chemical synthesis.

The standard sol-gel production stage firstly includes the mixture in about 200 ml of an alcohol solvent 3 of about 6 $10^{-3}$ mole of a compound containing the metal 4 of the active element and about 18 $10^{-3}$ mole of sol-gel monomers 5.

The formula of the solvent 3 is R—OH, for example ethanol.

The compound containing the metal 4 forming the active element, such as erbium, is an erbium acetylacetonate or an erbium acetate.

Each sol-gel monomer 5 is of the $(R_1O)_3M_1$—$(CHR'_1)_a$-A formula in which:
the group $(R_1O)_3M_1$ is the first metal alkoxide of the invention with an alkyl chain $R_1$ including 1 to 8 atoms,
the group $(CHR'_1)_a$ contains one hydrogen atom or an alkyl chain $R'_1$ including 1 to 4 carbon atoms, a being a whole number of between 1 and 4,
A is an organic complexing agent containing an atom or group of atoms able to provide electrons, such as amines.

Preferably the formula of the monomer is $(R_1O)_3M_1$—$(CH_2)_3$—NH—$(CH_2)_2$—$NH_2$ as shown on FIG. 3, or the formula $(R_1O)_3M_1$—$(CH_2)_3$—$NH_2$.

In addition, $R_1$ is advantageously identical to the group R of the solvent 3 and the metal 51 of the first metal alkoxide is preferably a silicon atom.

From this mixture, the metal 4 is complexed resulting in the formation of an organometallic core 6 dissolved in the solvent 3. The metal 4 is therefore associated with each nitrogen atom by an electron provider/acceptor 61.

Added to this medium containing the organometallic core 6 are 54 $10^{-3}$ mole of a second metal alkoxide 7 with the formula $(R_2O)_4M_2$ if the metal is tetravalent, as shown on FIG. 3, or with the formula $(R_2O)_3M_2$ if the metal is trivalent.

1 g of distilled water 7' is added so as to produce a sol-gel condensation/hydrolysis reaction between the first and second metal alkoxides at a temperature of between 40° C. and the boiling temperature of the solvent 3 and preferably at a temperature of between about 70 and 75° C. when the solvent 3 is ethanol.

In one variant, the hydrolysis stage can be advantageously dissociated from the condensation stage according to the difference of reactivity between the first alkoxide and the second metal alkoxide, which depends on the nature of the metals $M_1$ and $M_2$.

In a first configuration of this variant, the quantity of water required for hydrolysis is added at a temperature of between 30° C. and 70° C. and preferably about 50° C. in the medium so as to form the links $M_1OH$ able to then react on the second added alkoxide.

In this way, the organometallic core 6 increases until an organometallic compound 8 is formed via the reaction between first and second alkoxides, especially of the type:

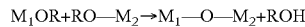

In a second configuration of this variant, the quantity of water required for hydrolysis is added at a temperature of between 30° C. and 70° C., preferably about 50° C., to the second alkoxide 7 so as to form the links $M_2OH$ before insertion into the medium.

In this way, the organometallic 6 increases until an organometallic compound 8 is formed via the reaction between first and second alkoxides, especially of the type:

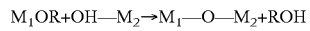

In addition, $R_2$ is advantageously identical to the group R of the solvent 3 and the metal 71 of the second metal alkoxide 7 is preferably a silicon atom or an aluminum.

Advantageously, the second alkoxide 7 can be a heterometallic complex, for example of the aluminosilicate type, in which case the metal $M_2$ is aluminum and the group $OR_2$ of the second alkoxide 7 has the formula $OSi(OR_1)_3$.

An adding of the solvent 3 (stage not shown) then makes it possible to dilute the organometallic compound 8 by limiting via dispersion the reactions between organometallic compounds.

After this, a stage is carried out for cross-linking the structure of the compound 8 by adding under stochiometric quantity of water 9 with respect to the number of links $M_2OR_2$ contained in the compound 8. The second neighboring alkoxides 7 react with respect to one another (as symbolized by the arrows 121) so as to form in a suspension the precursor organometallic compound 12 of a particles of the invention. An ammonia type catalyst can be added to facilitate this cross-linking reaction.

The addition of a cosolvent, such as acetylacetone or an organic acetate (stage not shown) makes it possible to avoid the formation of aggregates of organometallic precursors 12. Filtering can also be carried out at this level so as to eliminate any possible aggregates of precursors 12.

Under the action of a nebulizer, ultrasonic device or pulverizer for example, breaking the surface of the liquid medium, droplets containing the precursor 12 are ejected from the medium (stage not shown).

A 'cracking' stage carried out at a temperature of about 500° C. then consists of transforming each droplet containing the precursor 12 into a particle $1a$ via eliminating the organic elements 13.

The active element 4 is thus surrounded by oxides of metals 52, 72 originating from the first and second metal alkoxides.

The size of the particles, smaller than 20 nm, is predetermined by adjusting the added quantity of second alkoxide 7 according to the desired size for the compound 8. Thus, a second level of growth shall require the adding 162 $10^{-3}$ moles of a second alkoxide 7 and about 3 g of water whilst a third level shall require the adding of 486 $10^{-3}$ moles of a second alkoxide and about 9 g of water.

By way of information, a compound 8 obtained after the third level of growth shall result in obtaining a particle of the invention having a diameter of about 7 nm.

A particle of the invention can also be prepared by laser ablation.

Thus, FIG. 4 diagrammatically shows a stage for preparing the particles 1b according to the invention by laser ablation.

Laser ablation is carried out in a chamber 15 under a pressure of between about 1 and 100 mbars of a neutral pulsed or static nitrogen gas 18 and in which a target 17, such as $Y_2O_3$ doped by erbium, rests on a support 16.

A pulsed <<excimer>> laser 19 produces an ultraviolet beam 191, for example at the wavelength of 248 nm, with a mid-height pulsed period of about ten nanoseconds (typically 25 ns), at a pulses repetition frequency of between about 5 and 100 Hz and a high power density of between about 10 and 100 mW/cm$^2$. This beam 191 irradiates the target 17 and thus provokes the ejection of atoms or groups of atoms, which interact with the neutral gas by collisions and condensing until the particles 1b are formed.

The size of the particles, less than 20 nm, is predetermined by adjusting the power density and gas pressure according to the nature of the target.

In addition, one or several other targets (not shown) can be placed on the support 16, for example rotating, for the production of several types of particles.

FIG. 5 diagrammatically shows a stage for incorporating the particles 1a, 2b in a precursor 10' of the main matrix of the core of an amplifying optical fiber of the invention, said particles being of the type shown on FIG. 1.

After they have been produced by chemical synthesis and laser ablation respectively, the particles 1a, 1b are simultaneously or successively transported with the aid of an entraining gas 22 into a chamber 23 including a tube 231 for routing the particles to a location of the modified chemical vapour deposition process means 27 (MCVD).

Moreover, a liquid medium 24 contains elements 101 used to form the precursor 10' of the main matrix, such as $SiCl_4$, $GeCl_4$, $POCl_3$. These elements 101 are vaporized with the aid of an air humidifier 10 in the chamber 23 including a tube 232 for routing these elements to the location of the modified chemical vapor deposition process means 27.

The means 27 are constituted by a blow pipe 271 able to move along a rotating silicon tube 26 by means of a translation support device 272. These means thus allow depositions inside the tube 26 by means of thermophoresis.

In a first embodiment, the elements 101 constituting the precursor of the main matrix are deposited by modified chemical vapor phase deposition at a temperature of between about 1500° C. and 1700° C. in the internal surface of the cladding 11 placed inside the tube 26, thus forming the precursor 10' in the form of a porous layer which is then covered by a layer (not shown) containing the particles 1a, 1b, also deposited by modified chemical vapor phase deposition at a minimum temperature 1300° C.

In a first variant of this embodiment, the elements constituting the precursor and the particles are deposited several times alternately so as to form a stacking of layers.

In a second variant of this embodiment, the elements constituting the precursor and the particles are deposited simultaneously.

In another embodiment (not shown), the particles of the invention can be incorporated in the precursor of the main matrix of the core by impregnation. In this embodiment, the particles are contained in a liquid brought into contact with the internal porous surface of the precursor during the time required for the liquid to impregnate the internal layer, generally at least one hour.

Advantageously, a stage for drying the porous layer of matrix doped by the particles of the invention can be effected under a current of $Cl_2$ and/or $O_2$ at a temperature of between 1000° C. and 1300° C. following depositing so as to eliminate any trace of organic residue in the form of water vapor and $CO_2$.

Next, the traditional stages for forming the preform of the fiber are carried out by appropriate heat treatments and stretching of the preform so as to constitute the fiber of the invention.

Furthermore, a planar guide, such as the one shown on FIG. 2, is produced by successive depositings by centrifugal means. This type of depositing consists of coating a given substrate of a layer with the aid of a device producing an ultrarapid gyratory movement for regularly spreading the layer on the substrate. In this case, the incorporation of the particles is carried out prior to depositing of the core layer via merely mixing in the precursor of the main matrix.

Of course, the preceding description has been given purely by way of illustration. This element could be replaced by any equivalent element without departing from the context of the invention.

The particles of the invention can in certain cases be deliberately incorporated in the cladding.

For example, a stage for storing the particles in a solvent is possible before they are incorporated.

What is claimed is:

1. An optical guide comprising an amplifier medium that comprises:
    a core in a main matrix of a transparent material, the main matrix containing particles, each particle being formed of a submicronic matrix that is distinct from the main matrix and doped by an active metallic element,
    an external guiding cladding in contact with the core,
    wherein the size of the particles is smaller than 20 nm and wherein said active element is not present in the main matrix.

2. The optical guide according to claim 1, wherein the main matrix comprises several types of said particles, the particles of various types being distinct from one another via their distinct submicronic matrix and/or by their distinct active element.

3. The optical guide according to claim 1, wherein the submicronic matrix is selected from metallic oxide-based, fluoride-based, metallic oxifluoride-based, sulfur-based and silicon-based matrices and matrices containing the ions $La^{3+}$ and/or $Al^{3+}$.

4. The optical guide according to claim 1, wherein the active metallic element is selected from the ions of rare earths, ions of transition metals, erbium, ytterbium and thulium ions and the ions $Cr^{4+}$ and $Mn^{3+}$.

5. The optical guide according to claim 1, wherein the transparent material is selected from vitreous materials, polymers, silicon glass, polycarbonates, polymethylmethacrylates and polymers containing fluorine.

6. The optical guide according to claim 1, wherein the optical guide is an optical fiber or a planar guide.

7. Method for producing an optical guide comprising an amplifier medium including:
    a core in a main matrix of a transparent material, the main matrix containing particles, each formed of a submicronic matrix distinct from the main matrix and doped by an active metallic element,
    an external guiding cladding in contact with the core, wherein it includes the following stages:
  a stage for preparing said particles selected from chemical synthesis and laser ablation,
  a stage for incorporating said particles in a precursor of the main matrix.

8. Method for producing a guide according to claim 7, wherein chemical synthesis includes a stage for producing sol-gel type organometallic precursors of said particles including the active element followed by a stage for forming organometallic droplets by vaporizing the organometallic precursors and a stage for transforming the droplets into particles by eliminating the organic elements.

9. Method for producing a guide according to claim 8, wherein the sol-gel production stage includes:
  The mixing in an alcohol solvent of a compound containing the metal of the active element with sol-gel monomers each including a complexing compound linked to a first metal alkoxide,
  The formation of organometallic cores by complexing the metal of the active element,
  The growth of the organometallic cores in organometallic compounds by adding second metal alkoxides reacting with the first alcoxydes, and
  The cross-linking of the structure of said compounds via the intramolecular sol-gel reaction so as to form said organometallic precursors.

10. Method for producing a guide according to claim 9, wherein:
  The first and second metal alkoxides are selected from silicon and aluminum alkoxides, and
  The organic complexing compound is selected from the atoms or groups of donor atoms and preferably amines, acetates, beta-diketonates, thiols and ethers.

11. Method for producing a guide according to claim 7, wherein laser ablation includes a stage for ejecting atoms by the irridiation of a target doped by said active elements selected from the composition targets approximately identical to said particles, followed by a stage for forming said particles via condensation under gas pressure of the ejected atoms.

12. Method for producing a guide according to claim 11, wherein the targets are selected from the doped metallic oxides and metallic fluorides and preferably $Al_2O_3$ doped by erbium ions, $Sb_2O_3$ doped by thulium ions, $LaF_3$ doped by erbium ions, $Y_2O_3$ doped by erbium ions and doped ZnO.

13. Method for producing a guide according to claim 7, wherein the stage for incorporating the particles is selected from a stage for impregnating said precursor of the main matrix, a stage for the chemical vapour depositing on said precursor and a mixing stage in the precursor.

14. Method for producing a guide according to claim 7, wherein it includes a stage for forming said precursor of the main matrix by depositing on at least one portion of the cladding and preferably selected from modified vapor phase depositings and depositings via centrifugal means.

15. A method for producing an optical guide comprising an amplifier medium, wherein the amplifier medium comprises a core in a main matrix of a transparent material, the main matrix containing particles that are each formed of a submicronic matrix distinct from the main matrix and doped by an active metallic element, and an external guiding cladding in contact with the core, wherein the method comprises:
  preparing said particles by at least one of chemical synthesis and laser ablation, and incorporating said particles in a precursor of the main matrix.

16. The method for producing an optical guide according to claim 15, wherein chemical synthesis comprises:
  producing sol-gel type organometallic precursors of said particles including the active metallic element,
  forming organometallic droplets by vaporizing the organometallic precursors, and
  transforming the droplets into particles by eliminating the organic elements.

17. The method for producing an optical guide according to claim 16, wherein producing sol-gel comprises:
  mixing, in an alcohol solvent, a compound containing the metal of the active metallic element and sol-gel monomers, wherein the sol-gel monomers each comprise a complexing compound linked to a first metal alkoxide,
  forming the organometallic cores by complexing the metal of the active metallic element,
  growing the organometallic cores in organometallic compounds by adding second metal alkoxides that react with the first alcoxydes, and
  cross-linking of the structure of said compounds via the intramolecular sol-gel reaction so as to form said organometallic precursors.

18. The method for producing an optical guide according to claim 17, wherein:
  the first and second metal alkoxides are selected from silicon and aluminum alkoxides, and
  the organic complexing compound is selected from at least one of amines, acetates, beta-diketonates, thiols and ethers.

19. The method for producing an optical guide according to claim 15, wherein laser ablation ejects atoms by the irridiation of a target doped by said active elements selected from the composition targets approximately identical to said particles, followed by forming said particles via condensation under gas pressure of the ejected atoms.

20. The method for producing an optical guide according to claim 19, wherein the targets are selected from at least one of doped metallic oxide, metallic fluorides, $Al_2O_3$ doped by erbium ions, $Sb_2O_3$ doped by thulium ions, $LaF_3$ doped by erbium ions, $Y_2O_3$ doped by erbium ions and doped ZnO.

21. The method for producing an optical guide according to claim 15, wherein the incorporation of the particles is selected from a step of impregnating said precursor of the main matrix, a step of chemical vapor deposition on said precursor and a mixing step in the precursor.

22. The method for producing an optical guide according to claim 15, wherein the method further comprises forming said precursor of the main matrix by deposition on at least one portion of the cladding.

* * * * *